(12) United States Patent
Schuttenberg et al.

(10) Patent No.: US 9,436,210 B1
(45) Date of Patent: *Sep. 6, 2016

(54) CONTROL_MECHANISM FOR SELECTIVELY SHORTING CLOCK GRID BY ELECTRICALLY CONNECTING AND DISCONNECTING CLOCK BRANCHES ONCE PER CLOCK CYCLE

(71) Applicant: MARVELL INTERNATIONAL LTD., Hamilton (BM)

(72) Inventors: Kim Schuttenberg, Gilbert, AZ (US); Franco Ricci, Phoenix, AZ (US)

(73) Assignee: MARVELL INTERNATIONAL LTD. (BM)

( * ) Notice: Subject to any disclaimer, the term of this patent is extended or adjusted under 35 U.S.C. 154(b) by 17 days.

This patent is subject to a terminal disclaimer.

(21) Appl. No.: 14/093,587

(22) Filed: Dec. 2, 2013

Related U.S. Application Data

(63) Continuation of application No. 13/036,287, filed on Feb. 28, 2011, now Pat. No. 8,607,090.

(60) Provisional application No. 61/310,101, filed on Mar. 3, 2010.

(51) Int. Cl.
*G06F 1/04* (2006.01)
*G06F 1/24* (2006.01)
*G06F 11/00* (2006.01)
*G06F 1/10* (2006.01)

(52) U.S. Cl.
CPC .................................. *G06F 1/10* (2013.01)

(58) Field of Classification Search
CPC .................................. G06F 1/04; G06F 1/10
USPC ......................................................... 713/500
See application file for complete search history.

(56) References Cited

U.S. PATENT DOCUMENTS

| | | | |
|---|---|---|---|
| 6,583,659 B1* | 6/2003 | Kwong et al. | 327/295 |
| 6,848,058 B1* | 1/2005 | Sinclair et al. | 713/322 |
| 7,911,253 B1* | 3/2011 | Nassim | 327/295 |
| 2005/0258881 A1* | 11/2005 | Schultz | 327/161 |
| 2008/0222445 A1* | 9/2008 | Liran | 713/503 |
| 2008/0229135 A1 | 9/2008 | Kanasugi et al. | |
| 2008/0297224 A1 | 12/2008 | Rajagopal | |

* cited by examiner

Primary Examiner — Robert Cassity

(57) ABSTRACT

Systems, methods, and other embodiments are described that are associated with selective shorting of clock branches. In one embodiment, an apparatus includes a selective shorting device connected between a first clock branch that conducts a slow clock signal having a first frequency and a second clock branch that conducts a fast clock signal having a second frequency that is an integer multiple of the first frequency. The selective shorting device is configured to electrically connect and disconnect the first clock branch and the second clock branch. The selective shorting control mechanism is configured to control the selective shorting device to electrically connect the clock branches during a controlling portion of the slow clock signal.

17 Claims, 6 Drawing Sheets

CONTROL MECHANISM FOR SELECTIVELY SHORTING CLOCK GRID BY ELECTRICALLY CONNECTING AND DISCONNECTING CLOCK BRANCHES ONCE PER CLOCK CYCLE

CROSS REFERENCE TO RELATED APPLICATIONS

This patent disclosure is a continuation of U.S. patent application Ser. No. 13/036,287 filed on Feb. 28, 2011, now U.S. Pat. No. 8,607,090 which claims benefit under 35 USC §119(e) to U.S. Provisional Application Ser. No. 61/310,101 filed on Mar. 3, 2010, which is hereby wholly incorporated by reference.

BACKGROUND

Integrated circuits typically use one or more clock signals to synchronize components in the integrated circuit. Clock trees are used to branch these clock signals through buffers from a common source to components located in various areas on the integrated circuit. For example, a given source clock signal may feed into three buffers to produce three clock signals at a second branch level, which may feed into three more buffers to produce nine clock signals at a third branch level. Clock signals at any level can be used for clocking synchronous components to coordinate the functions within the integrated circuit. Therefore, the clock signals at any particular level have a predefined phase relationship to one another.

For various reasons, however, any two clock signals at the same level of the same clock tree may be slightly out of phase with one another or do not otherwise have the desired phase relationship. This phase difference between clock signals is called "clock skew." Clock skew can have several causes. For example, the load experienced by one clock signal may introduce a delay into the clock tree branch that is different from the delay along another clock tree branch. Also, routing differences between clock tree branches can result in different resistance between the branches and therefore different propagation delays along the branches. Furthermore, changes in temperature, different applied voltages and tolerances in semiconductor fabrication processes can affect clock skew.

SUMMARY

In general, in one aspect this specification discloses an apparatus. The apparatus includes a selective shorting device connected between a first clock branch that conducts a slow clock signal having a first frequency and a second clock branch that conducts a fast clock signal having a second frequency that is an integer multiple of the first frequency. The selective shorting device is configured to electrically connect and disconnect the first clock branch and the second clock branch. The selective shorting control mechanism is configured to control the selective shorting device to electrically connect the clock branches during a controlling portion of the slow clock signal.

In general, in another aspect, this specification discloses a method for selectively shorting clock branches. The method includes sensing a controlling portion of a slow clock signal having a first frequency conducted by a first clock branch. The method also includes electrically connecting the first clock branch to a second clock branch during the sensed controlling portion of the slow clock signal. The second clock branch conducts a fast clock signal having a second frequency that is an integer multiple of the slow clock signal.

In general, in another aspect, this specification discloses a device that performs selective shorting of clock branches. The device includes a clock tree that has a first clock branch that conducts a slow clock signal at a first frequency and a second clock branch that conducts a fast clock signal at a second frequency that is an integer multiple of the first frequency. The device also includes a selective shorting device electrically coupled between the first clock branch and second clock branch. The selective shorting device is configured to selectively electrically connect the first clock branch to the second clock branch, and to selectively electrically disconnect the first clock branch from the second clock branch. A selective shorting control mechanism is configured to control the selective shorting device to electrically connect the clock branches during a controlling portion of the slow clock signal being conducted by the first clock branch to align the clock signals.

BRIEF DESCRIPTION OF THE DRAWINGS

The accompanying drawings, which are incorporated in and constitute a part of the specification, illustrate various systems, methods, and other embodiments of the disclosure. The illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Described herein are example devices, methods, and other embodiments associated with selectively shorting clock tree branches to reduce clock skew while also reducing energy consumption. Clock tree branches that are electrically connected to one another are called clock grids. Electrically connecting, or shorting, clock branches aligns the clock signals propagating along the branches. At any time the clock signals are not equal to one another, electrically connected clock branches are in contention with one another (driving different values), which leads to an increase in power consumption. Typically, devices in an integrated circuit are clocked by a specific portion of the clock signal, such as a rising or falling edge. Selectively shorting clock branches during the controlling portion of the clock signal while electrically disconnecting the clock branches during the remainder of the clock signal aligns the controlling portions of the clock signal without incurring the additional power consumption associated with aligning non-controlling portions of the clock signal.

Figure 1:
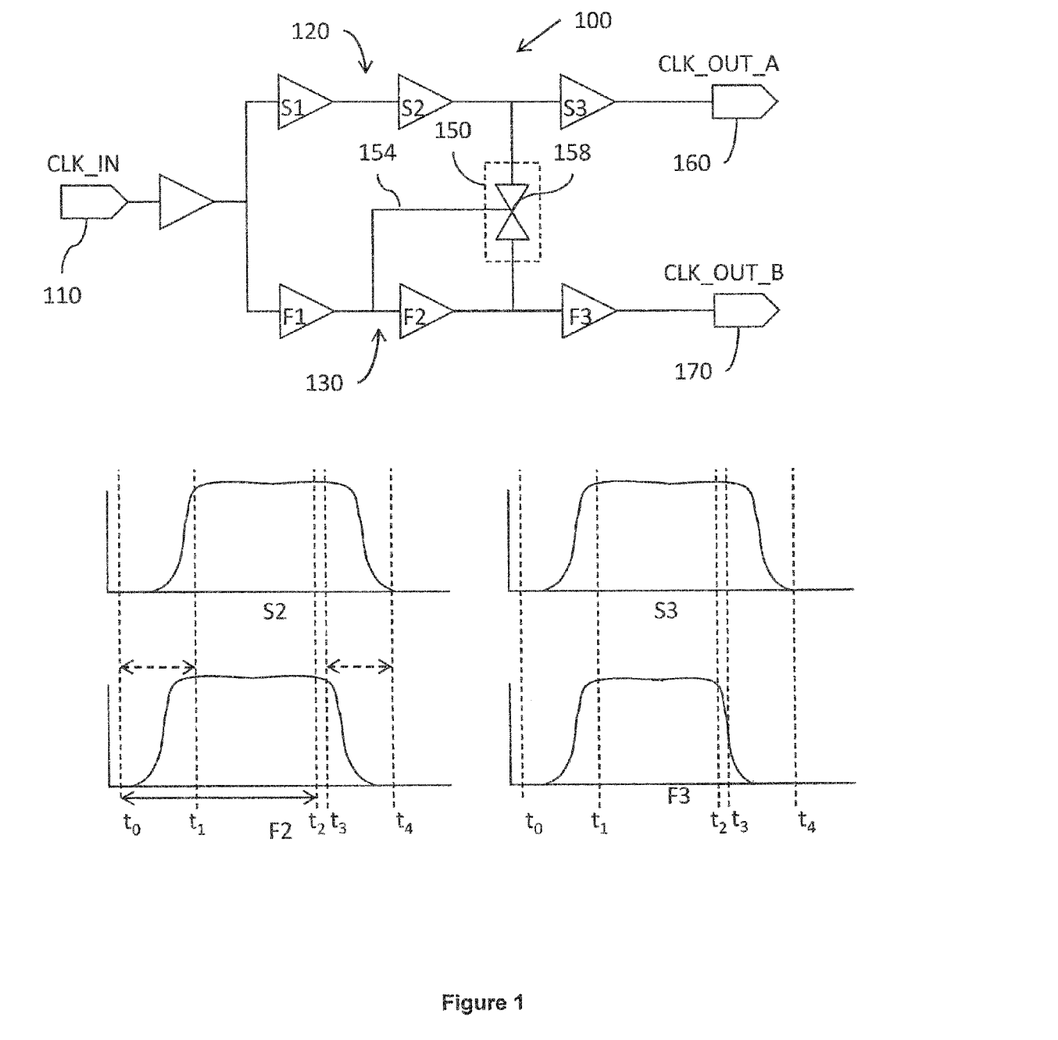
FIG. 1 illustrates one embodiment of an apparatus associated with selective shorting for clock grids.

With reference to FIG. 1, one embodiment of a clock tree 100 that includes a selective shorting device 150 is illustrated. The clock tree 100 propagates a clock signal from a source clock 110 through a first clock branch 120 and a second clock branch 130 to provide synchronized first and second output clock signals 160, 170. The first clock branch 120 includes three buffers S1, S2, S3 and the second clock branch 130 includes three buffers F1, F2, F3. For the purposes of this description, the first clock branch 120 is "faster" than the second clock branch 130, possibly because of differences in the fabrication of the buffers S1-S3 as compared to the buffers F1-F3, resulting in clock skew between the first clock output 160 and the second output clock signal 170. For the purposes of this description, unless otherwise specified, the devices in the integrated circuit are clocked using the rising edge of the clock pulse. Thus, the controlling portion of the clock signal is the rising edge of the pulse.

The first clock branch 120 and the second clock branch 130 are selectively electrically connected with the selective shorting device 150. The selective shorting device 150 selectively electrically connects and disconnects the first clock branch 120 and the second clock branch 130 to align a controlling portion (e.g., rising edge) of the first and second output clock signals 160, 170.

In the embodiment illustrated in FIG. 1, the selective shorting device 150 comprises a pass gate circuit 158. The pass gate circuit 158 is controlled by a control mechanism 154 to selectively short the first clock branch 120 to the second clock branch 130 during a rising edge of the clock signal. The control mechanism 154 comprises a conductive path between the clock branch 130 and the pass gate circuit 158. The conductive path is connected to an output of a buffer (e.g., F1) that is prior to the buffer (e.g., F2) whose output is selectively shorted by the pass gate circuit 158. Thus a voltage on the clock signal from the prior buffer F2 that is above a threshold voltage controls the pass gate circuit 158 to transition to a conducting state and short the first and second clock branches 120, 130 to one another. The pass gate circuit 158 could be configured to short the first clock branch 120 to the second clock branch 130 when the clock voltage from the prior buffer is below a threshold value.

Referring now to the traces in FIG. 1, the clock skew can be seen in trace S2, which schematically illustrates the clock signal in buffer S2, as compared to trace F2, which schematically illustrates the clock signal in buffer F2. The clock signal rising edge in buffer F2 begins at $t_0$ while the rising edge begins in buffer S2 slightly later. The pass gate circuit 158 shorts the first and second clock branches 120, 130 (between the second buffers S2, F2 and the third buffers S3, F3) to one another during the time period $t_0$ to $t_2$. This time period corresponds to the time during which the voltage on the prior buffer (e.g., F1) is above the threshold voltage as provided by the control mechanism 154.

The buffers between levels in the clock tree typically introduce a delay between their inputs and outputs, so clock signals at different levels in the clock tree are naturally skewed from each other. Thus, the control mechanism 154 is connected to a signal from a buffer (e.g., F1) a sufficient number of buffers prior to the buffer (e.g., F2) whose signal is being aligned by the pass gate 158. This will ensure that the rising edge from the buffer producing the control signal (e.g. F1) will occur in time to open the pass gate 158 to align to the rising edges from the buffers whose signals are being aligned (e.g., F2, S2). The time period during which the pass gate 158 shorts the clock branches 120, 130 is shown by the solid arrows in trace F2. Increased power consumption is caused when the values on the branches differ from one another. Thus, while the pass gate 158 shorts the clock branches 120, 130 during the time between $t_0$ and $t_2$, no significant increase in power consumption is experienced between $t_1$ and $t_2$.

The clock signals received in the buffers S3 and F3 are shown in traces S2 and F2, respectively. The times denoted in S3 and F3 correspond to the times in F2 and F3 during a subsequent clock pulse. The rising edges of the clock signals in S3 and F3 are aligned or synchronized as can be seen by comparing the traces S3 and F3 between $t_0$ and $t_1$. The selective shorting device 150 (e.g., pass gate circuit 158) selectively disconnects the first clock branch 120 and the second clock branch 130 when the prior buffer's clock signal falls below the threshold voltage. Thus, the falling edges of the clock signals have not been aligned as can be seen by comparing the traces S3 and F3.

Some clock grids include shorting bars to align clock signals. Shorting bars are simply short circuit paths created between clock branches. These shorting bars function to electrically connect and align the clock circuits at all times. The shorting bars draw current when the clock branches are driving different voltages. Thus, a simple shorting bar would be conducting current and causing an increased power consumption during both the time periods $t_0$-$t_1$ and $t_3$-$t_4$ as shown by the dashed arrows in trace F2. The additional power consumption caused by the shorting bar during time period $t_3$-$t_4$ does not provide significant gains in circuit performance. This is because shorting the clock branches during the time period $t_3$-$t_4$ aligns the non-controlling falling edge of the clock signals.

Figure 2:
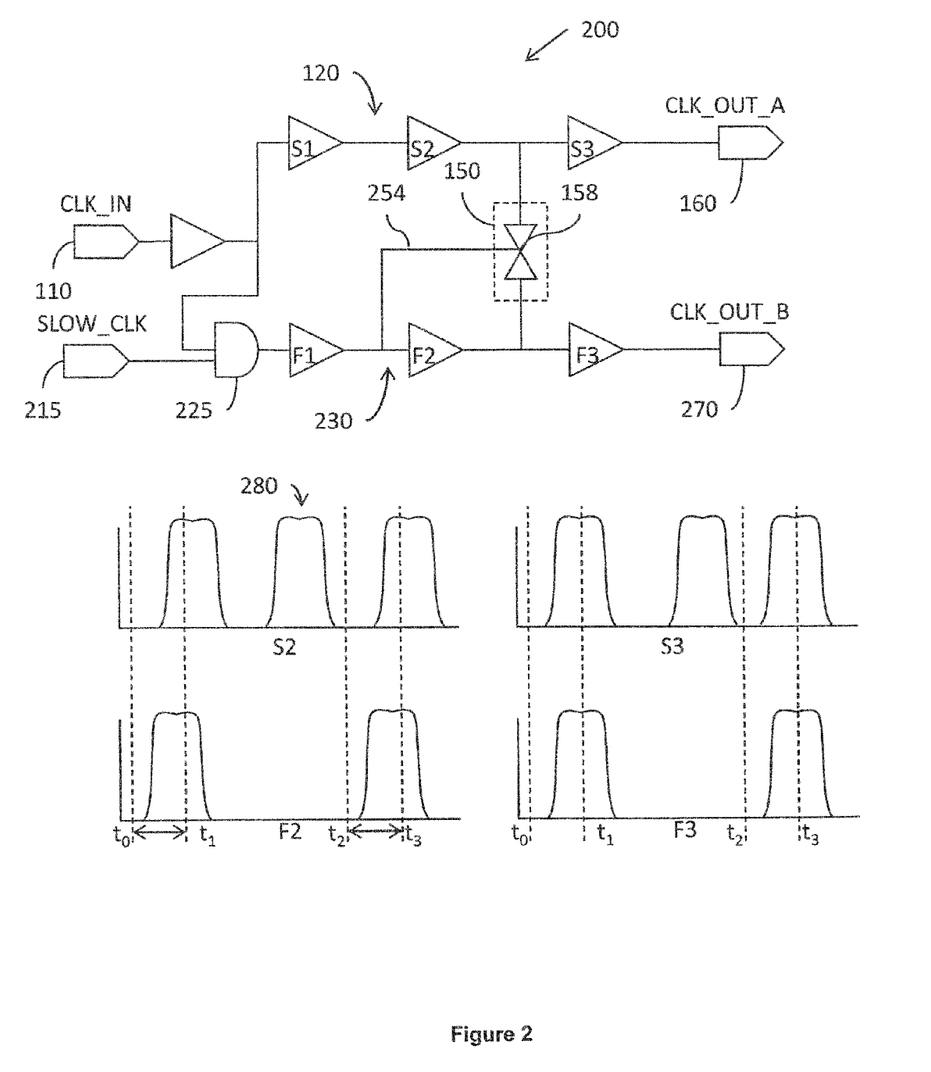
FIG. 2 illustrates one embodiment of an apparatus associated with selective shorting for clock grids.

Another disadvantage of a simple shorting bar is that it is only effective to align clock signals having the same frequency. FIG. 2 illustrates another embodiment of a clock tree 200 that includes a selective shorting device 150 used to align clocks signals having different frequencies. The clock tree 200 provides the first clock output signal 160 by way of the first clock branch 120 and a second "slow" clock output signal 270 by way of a second clock branch 230. The frequency of the first clock output signal 160 is an integer multiple of the second output clock signal 270. The second clock output signal 270 is produced by performing a logical AND operation (with AND gate 225) on a clock signal from a lower frequency clock 215 and the clock signal from the source clock 110. The difference in clock speeds between the first clock branch 120 and the second clock branch 130 means that they are in different power domains because increased clock speed results in higher power consumption and vice versa.

The clock tree 200 will produce a clock pulse on the second clock branch 230 when both the source clock 110 and the lower frequency clock 215 are producing a pulse. An example clock signal for the first clock branch 120 can be seen in trace S2 and an example clock signal for the second clock branch 230 can be seen in trace F2. In effect, the clock tree 200 produces a clock pulse on the second clock branch that coincides with every $n^{th}$ pulse of the clock signal on the first clock branch 120. In FIG. 2, the signal on the second clock branch 230 includes a pulse coinciding to every other clock pulse on the first clock branch 120. However, depending on the frequency of the lower frequency clock 215, the signal on the second clock branch 230 could include a pulse coinciding to every third, fourth, and so on, clock pulse on the first clock branch 120.

A simple shorting bar would not be effective to synchronize the first and second output clock signals 160, 270 because the shorting bar, which shorts the clock branches continuously, would connect the first and second clock branches 120, 230 to one another when the first clock branch 120 is producing a pulse and the second clock branch 230 is not producing a pulse (see pulse indicated by 280 on trace S2). This would result in an aberrant clock pulse on both the first and second clock branches 120, 230 that would not properly function to synchronize devices on the integrated circuit.

The pass gate circuit 158 can be used to align clock pulses on the second clock branch 230 with clock pulses on the first clock branch 120 that have corresponding pulses on the second clock branch 230. The alignment is accomplished by controlling the pass gate circuit 158 with a conductive path 154 from the second (slower) clock branch 230. The pass gate 158 will thus connect the first clock branch 120 to the second clock branch 230 when the clock signal from the buffer F1 exceeds the threshold voltage. The resulting clock signals in buffers S3 and F3 can be seen in the traces in FIG. 2. The first and third pulses in S3 are aligned with pulses in F3 while no alignment has been performed on the second pulse in S3.

Figure 3:
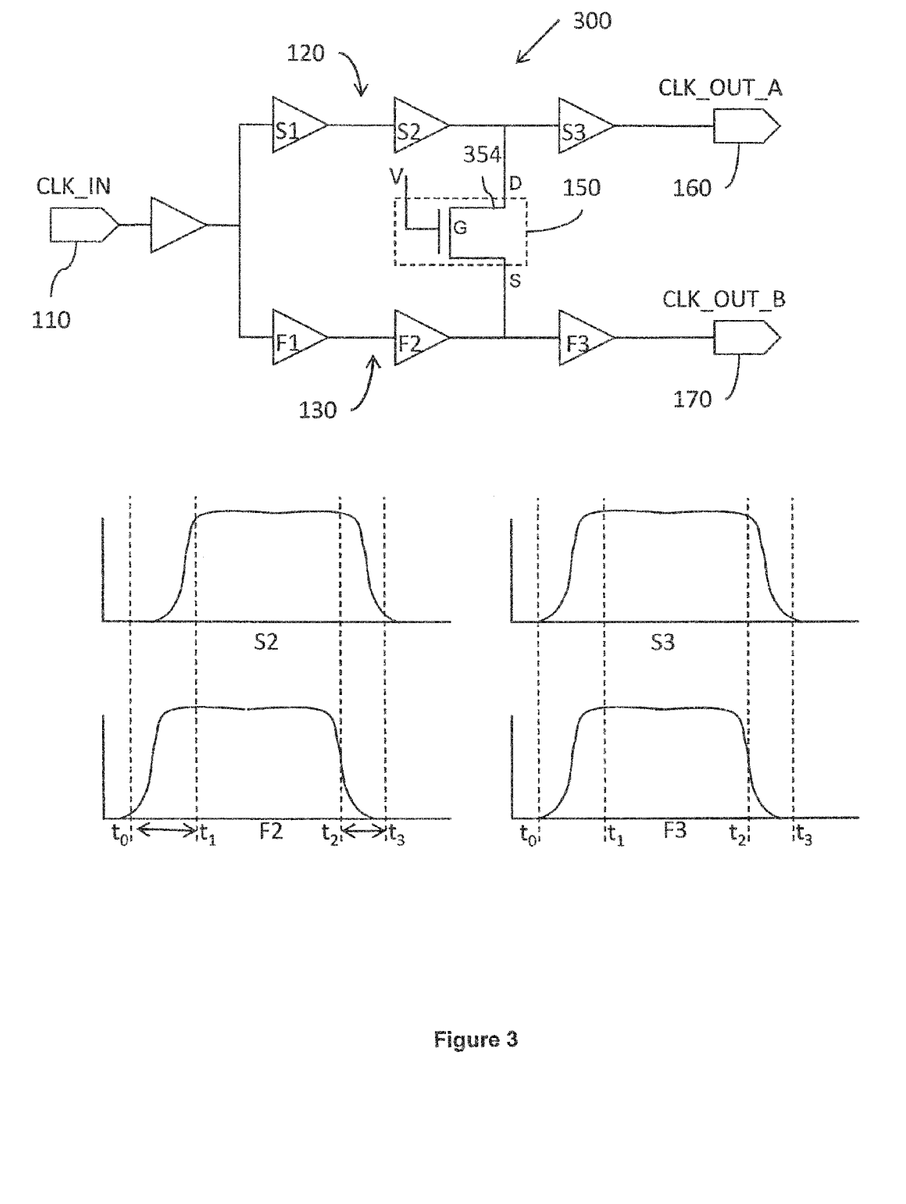
FIG. 3 illustrates one embodiment of an apparatus associated with selective shorting for clock grids.

With reference to FIG. 3, a clock tree 300 that includes another embodiment of a selective shorting device 150 is shown. The selective shorting device 150 includes an NMOS transistor 350. The NMOS transistor, by its inherent characteristics, is suited to perform selective shorting in clock trees in which the rising edge is the controlling portion of the clock signal. The NMOS transistor 350 has its drain connected to the first clock branch 120 and its source connected to the second clock branch 130. The gate of the NMOS transistor 350 is tied high (to a voltage equal to the clock high voltage level). When the clock signal on one of the clock branches begins to rise, the NMOS transistor 350 will quickly begin shorting the first and second clock branches 120, 130. Thus, the NMOS transistor 350 will short the first and second clock branches 120, 130 during the time interval between $t_0$ and $t_1$ in traces S2 and F2.

During the falling edge of the clock signals, the voltage difference between the drain and gate will be insufficient to transition the NMOS transistor 350 to its conducting state until the falling edge transition is partially completed. This can be seen in the traces S2 and F2 between $t_2$ and $t_3$. Thus, during the falling edge, the time during which the NMOS transistor shorts 350 the first and second clock branches 120, 130 is limited, reducing power consumption. Further, by the time the NMOS transistor 350 turns on to short the first and second clock branches 120, 130, both the first and second clock branches 120, 130 are driving similar values, further reducing power consumption. The clock signals in the buffers S3 and F3 show that the rising edges are aligned, while the falling edges are not. Specific threshold voltages may be selected for the NMOS transistor to maximize shorting time during rising edges while minimizing shorting time during falling edges.

Figure 4:
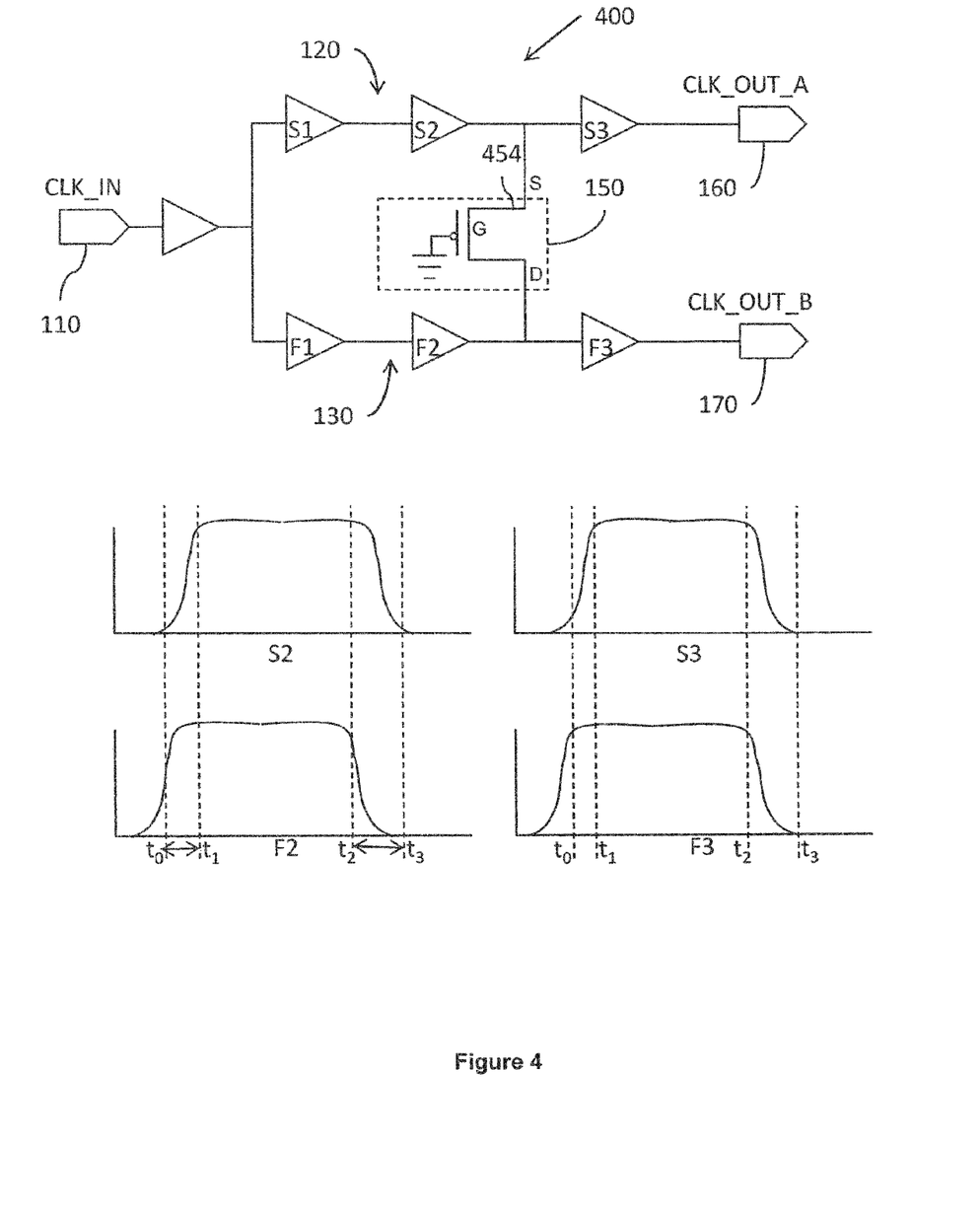
FIG. 4 illustrates one embodiment of an apparatus associated with selective shorting for clock grids.

With reference to FIG. 4, a clock tree 400 that includes another embodiment of a selective shorting device 150 is shown. The selective shorting device 150 includes a PMOS transistor 450. The PMOS transistor, by its inherent characteristics, is well suited to perform selective shorting in clock trees in which the falling edge is the controlling portion of the clock signal. The PMOS transistor 450 has its source connected to the first clock branch 120 and its drain connected to the second clock branch 130. The gate of the PMOS transistor 450 is tied to ground. When the clock signal on one of the clock branches begins to fall, the PMOS transistor 450 will quickly begin shorting the first and second clock branches 120, 130. Thus, the PMOS transistor 450 will short the first and second clock branches 120, 130 during the time interval between $t_2$ and $t_3$ in traces S2 and F2.

During the falling edge of the clock signals, the voltage difference between the source and gate will be insufficient to transition the PMOS transistor 450 to its conducting state until the rising edge transition is partially completed. This can be seen in the traces S2 and F2 between $t_0$ and $t_1$. Thus, during the rising edge, the time during which the PMOS transistor shorts 450 the first and second clock branches 120, 130 is limited, and may reduce power consumption. Further, by the time the PMOS transistor 450 turns on to short the first and second clock branches 120, 130, both the first and second clock branches 120, 130 are driving similar values, further reducing power consumption. The clock signals in the buffers S3 and F3 show that the falling edges are aligned, while the rising edges are not. Specific threshold voltages may be selected for the PMOS transistor to maximize shorting time during falling edges while minimizing shorting time during rising edges.

Figure 5:
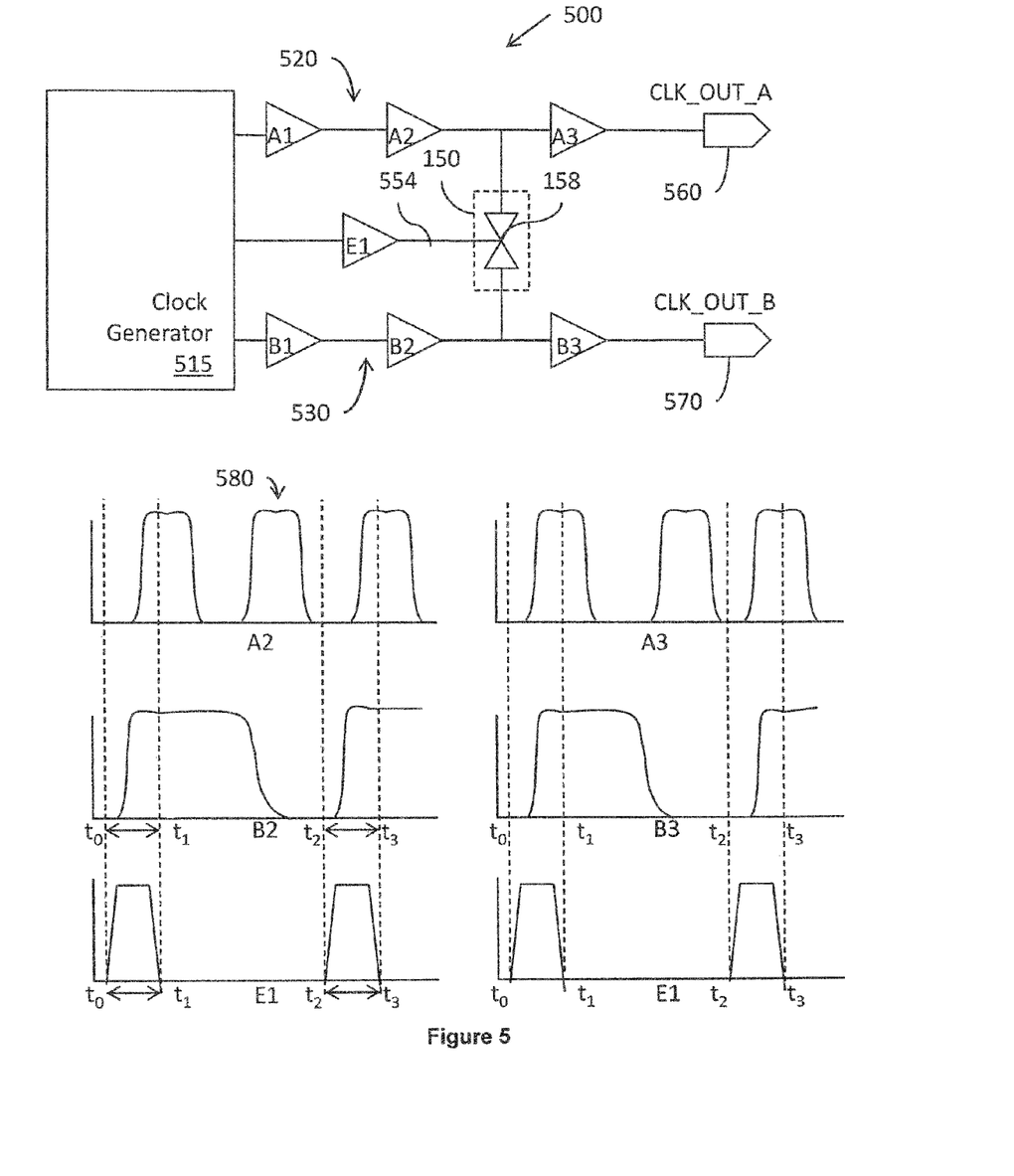
FIG. 5 illustrates one embodiment of an apparatus associated with selective shorting for clock grids.

With reference to FIG. 5, one embodiment of a clock tree 500 that includes a selective shorting device 150 is illustrated. The clock tree 500 propagates clock signals from a clock generator 515 through a first clock branch 520 and a second clock branch 530 to provide synchronized first and second output clock signals 560, 570. The first clock branch 120 includes three buffers A1, A2, A3 and the second clock branch 130 includes three buffers B1, B2, B3. The clock generator 515 is capable of simultaneously generating various clock signals. In the described embodiment, the first clock branch 520 carries a clock signal that has a frequency twice that of the clock signal on the second clock branch 530, as shown in the traces 580. Again, the controlling portion of the clock signal is taken to be the rising edge of the pulse.

The first clock branch 520 and the second clock branch 530 are selectively electrically connected with the selective shorting device 150. The selective shorting device 150 selectively electrically connects and disconnects the first clock branch 520 and the second clock branch 530 to align a controlling portion (e.g., rising edge) of the first and second output clock signals 560, 570.

In the embodiment illustrated in FIG. 5, the selective shorting device 150 comprises a pass gate circuit 158. The pass gate circuit 158 is controlled by a pass gate enabling pulse generated by the clock generator 515 to selectively short the first clock branch 520 to the second clock branch 530 during a rising edge of the clock signal.

Referring now to the traces in FIG. 5, the clock skew can be seen in trace A2, which schematically illustrates the clock signal in buffer A2, as compared to trace B2, which schematically illustrates the clock signal in buffer B2. The clock signal rising edge in buffer B2 begins at $t_0$ while the rising edge begins in buffer A2 slightly later. The pass gate circuit 158 shorts the first and second clock branches 520, 530 (between the second buffers A2, B2 and the third buffers A3, B3) to one another during the time period $t_0$ to $t_1$. This time period corresponds to the time during which the clock generator 515 is generating the enabling pulse on the enable input 554 to the pass gate.

The clock signals received in the buffers A3 and B3 are shown in traces A3 and B3, respectively. The times denoted in A3 and B3 correspond to the times in A2 and B2 during a subsequent clock pulse. The rising edges of the clock signals in A3 and B3 are aligned or synchronized as can be seen by comparing the traces A3 and B3 between $t_0$ and $t_1$. The selective shorting device 150 (e.g., pass gate circuit 158) selectively disconnects the first clock branch 520 and the second clock branch 530 when the clock generator 515 provides the enabling pulse to the pass gate circuit 158.

Figure 6:
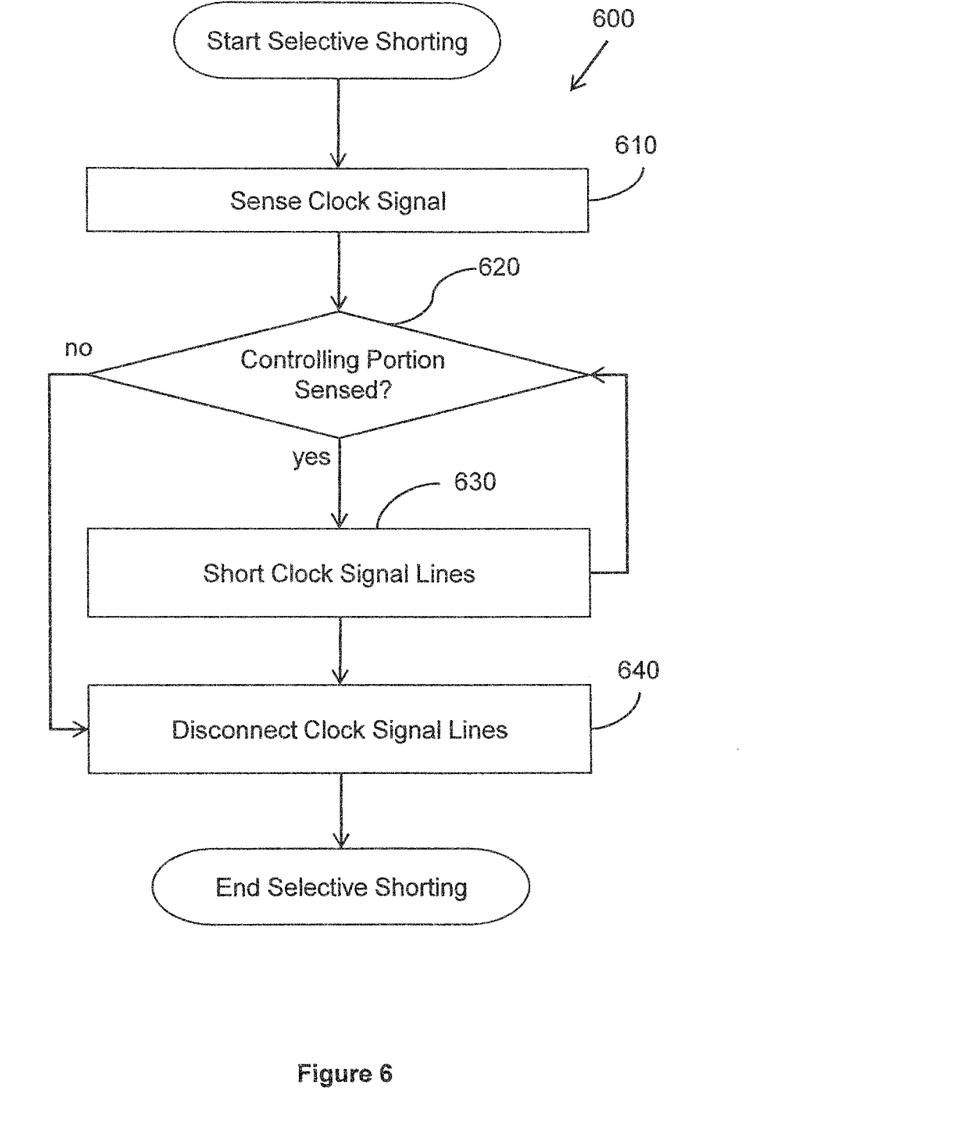
FIG. 6 illustrates one embodiment of a method associated with selective shorting for clock grids.

FIG. 6 illustrates one embodiment of a method 600 for performing selective shorting. At 610, a clock signal is sensed. At 620, if a controlling portion of the clock signal is sensed, clock signal lines are shorted at 630. At 620, if a controlling portion of the clock signal is not sensed, clock signal lines are disconnected at 640. For the clock trees 100, 200, and 500 (FIGS. 1, 2, and 5), the shorting and disconnecting is performed by the pass gate. For the clock trees 300 and 400 (FIGS. 3 and 4), the sensing, shorting, and disconnecting are all performed by a transistor device (e.g., NMOS transistor 350, PMOS transistor 450) having its source connected to one of the clock branches and its drain connected to the other of the clock branches. References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, is a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. Computer-readable medium described herein are limited to statutory subject matter under 35 U.S.C §101.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
 a selective shorting device connected between a first clock branch that conducts a slow clock signal having a first frequency and a second clock branch that conducts a fast clock signal having a second frequency that is an integer multiple of the first frequency;
 wherein the selective shorting device is configured to electrically connect and disconnect the first clock branch and the second clock branch; and
 a selective shorting control mechanism configured to, once per slow clock cycle:
  control the selective shorting device to electrically connect the first clock branch to the second clock branch; and
  control the selective shorting device to electrically disconnect the first clock branch from the second clock branch.

2. The apparatus of claim 1, wherein:
 the selective shorting device comprises a pass gate circuit that electrically connects the clock branches in response to a control signal from the selective shorting control mechanism; and
 the selective shorting control mechanism comprises an electrically conductive path between the first clock branch and the pass gate circuit.

3. The apparatus of claim 1, wherein:
 the selective shorting device comprises a pass gate circuit that electrically connects the clock branches in response to a control signal from the selective shorting control mechanism; and
 the selective shorting control mechanism comprises a pass gate circuit enabling pulse generated by the controlling portion of the second clock signal.

4. The apparatus of claim 1, wherein the first clock branch is in a first power domain and the second clock branch is in a second power domain.

5. The apparatus of claim 1, wherein:
 the selective shorting device comprises a pass gate circuit that electrically connects the clock branches in response to a control signal from the selective shorting control mechanism; and
 the selective shorting control mechanism comprises a pass gate circuit enabling pulse generated by a clock signal circuit that generates the slow clock signal.

6. The apparatus of claim 1, wherein the first clock branch and the second clock branch comprise a plurality of buffers and the selective shorting device is located between a path of buffers in the first clock branch and a path of buffers in the second clock branch.

7. A method, comprising:

sensing a controlling portion of a slow clock signal having a first frequency conducted by a first clock branch; and once per slow clock cycle:

electrically connecting the first clock branch to a second clock branch during the sensed controlling portion of the slow clock signal, and electrically disconnecting the first clock branch from the second clock branch, wherein the second clock branch conducts a fast clock signal having a second frequency that is an integer multiple of the slow clock signal.

8. The method of claim 7, wherein the electrically connecting is performed by a pass gate circuit that electrically connects the first clock branch to the second clock branch in response to a control signal provided by an electrically conductive path between the first clock branch and the pass gate circuit.

9. The method of claim 7, wherein the electrically connecting is performed by a pass gate circuit that electrically connects the first clock branch to the second clock branch in response to a pass gate circuit enabling pulse generated by a clock signal generator that generates the slow clock signal.

10. The method of claim 7, wherein the first clock branch is in a first power domain and the second clock branch is in a second power domain.

11. The method of claim 7, wherein electrically connecting the first clock branch to the second clock branch comprises electrically connecting the clock branches based, at least in part, on a relative state of the fast clock signal and the slow clock signal.

12. The method of claim 7, wherein electrically connecting the first clock branch and the second clock branch comprises connecting a first path of buffers in the first clock branch to a second path of buffers in the second clock branch.

13. A device comprising:

a clock tree comprising a first clock branch that conducts a slow clock signal at a first frequency and a second clock branch that conducts a fast clock signal at a second frequency that is an integer multiple of the first frequency;

a selective shorting device electrically coupled between the first clock branch and second clock branch, the selective shorting device being configured to selectively electrically connect the first clock branch to the second clock branch, and to selectively electrically disconnect the first clock branch from the second clock branch; and a selective shorting control mechanism configured to, once per slow clock cycle:

control the selective shorting device to electrically connect the first clock branch to the second clock branch; and control the selective shorting device to electrically disconnect the first clock branch from the second clock branch.

14. The device of claim 13, wherein:

the selective shorting device comprises a pass gate circuit that electrically connects the first clock branch to the second clock branch in response to a rising edge of a control signal from the selective shorting control mechanism; and the selective shorting control mechanism comprises an electrically conductive path between the first clock branch and the pass gate circuit.

15. The device of claim 13, wherein:

the selective shorting device comprises a pass gate circuit that electrically connects the first clock branch to the second clock branch in response to a rising edge of a control signal from the selective shorting control mechanism; and the selective shorting control mechanism comprises a pass gate circuit enabling pulse generated by a clock signal generator that generates the slow clock signal.

16. The device of claim 13, wherein the first clock branch and the second clock branch comprise a plurality of buffers and the selective shorting device is located between a first path of buffers in the first clock branch and a second path of buffers in the second clock branch.

17. The device of claim 13, wherein the first clock branch is in a first power domain and the second clock branch is in a second power domain.

* * * * *